United States Patent [19]
Doshi et al.

[11] Patent Number: 5,995,612
[45] Date of Patent: *Nov. 30, 1999

[54] TELECOMMUNICATIONS SYSTEM ARCHITECTURE

[75] Inventors: Bharat Tarachand Doshi, Holmdel; Norman Farber, Freehold; Thomas S. Giuffrida, Middletown; Paramasiviah Harshavardhana, Marlboro; Mahalakshmi Jairam, Randolph; Pravin Kumar Johri, Aberdeen; Arik Kashper, Holmdel; Steven S. Katz, Ocean, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,065

[22] Filed: Dec. 23, 1996

[51] Int. Cl.$^6$ .............................. H04M 7/00; H04M 3/00
[52] U.S. Cl. ......................... 379/219; 379/224; 379/229; 379/230; 379/242; 379/258
[58] Field of Search ..................................... 379/219, 224, 379/229, 242, 258, 88.01, 230, 67.1

[56] References Cited

U.S. PATENT DOCUMENTS

| | | |
|---|---|---|
| 5,101,451 | 3/1992 | Ash et al. ................. 379/221 |
| 5,237,604 | 8/1993 | Ryan ......................... 379/220 |
| 5,539,817 | 7/1996 | Wilkes ....................... 379/230 |
| 5,583,920 | 12/1996 | Wheeler, Jr. ................. 379/88 |
| 5,583,929 | 12/1996 | Ardon ....................... 379/230 |
| 5,684,961 | 11/1997 | Cidon et al. .............. 395/200.15 |

FOREIGN PATENT DOCUMENTS

| | | | |
|---|---|---|---|
| 0 361 649 | 7/1989 | European Pat. Off. | ........ H04L 12/18 |
| 0 556 515 | 12/1992 | European Pat. Off. | ......... H04Q 3/00 |
| 0 748 133 | 12/1996 | European Pat. Off. | ......... H04Q 3/00 |

*Primary Examiner*—Fan S. Tsang
*Assistant Examiner*—Allan Hoosain
*Attorney, Agent, or Firm*—Frederick B. Luludis; Guy H. Eriksen

[57] ABSTRACT

The efficiency of a telecommunications network is enhanced by associating each of the communication switches forming the network with an external connection control processor and forming the switches into respective groups of communication switches. The communication switches forming a respective group of switches are fully interconnected to one another and then each of the communications switches forming a respective one of the groups is connected at least one other group of telecommunication switches as a way of interconnecting the groups with one another.

17 Claims, 4 Drawing Sheets

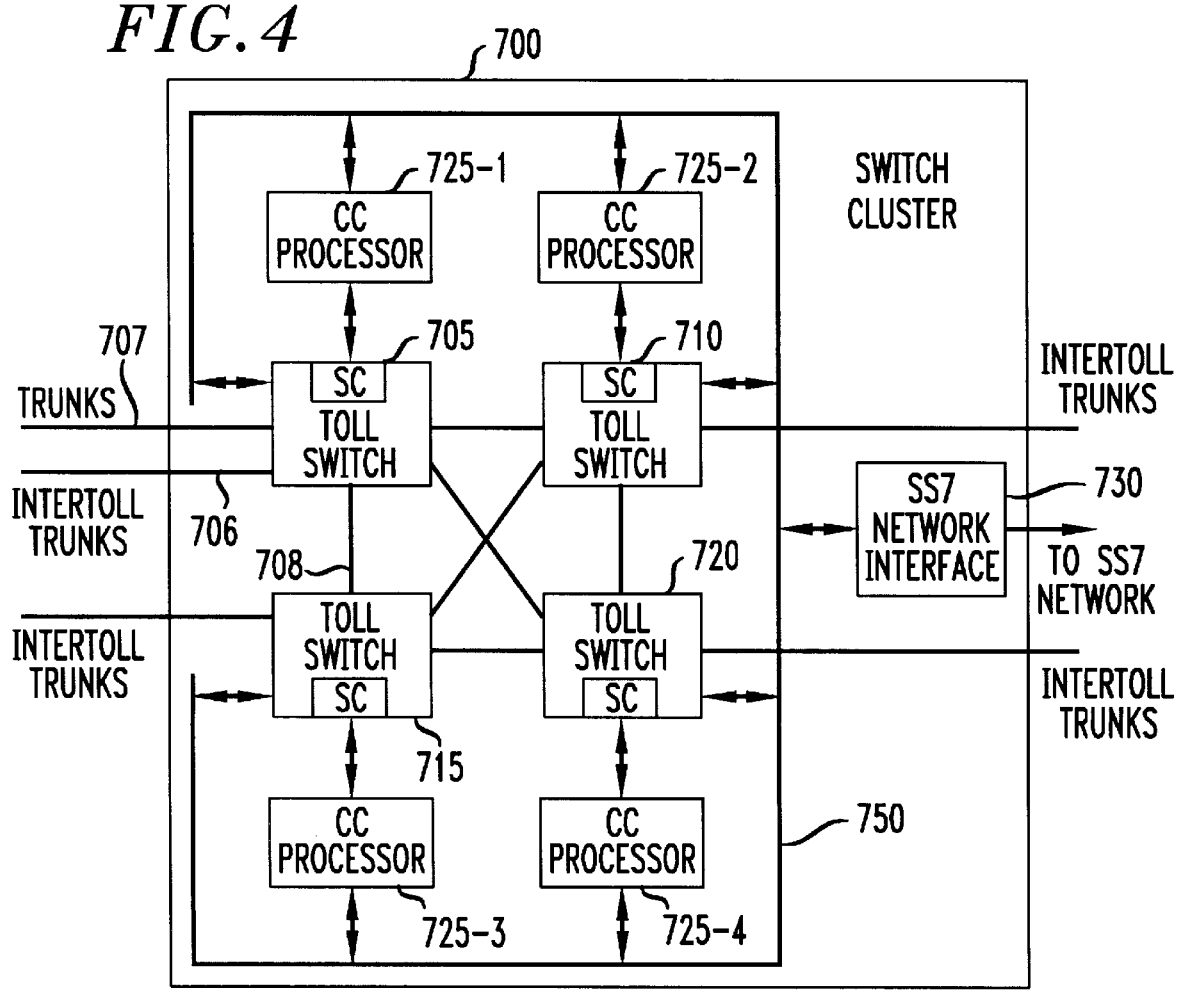

TELECOMMUNICATIONS SYSTEM ARCHITECTURE

FIELD OF THE INVENTION

The invention relates to a flexible architecture for a telecommunications system.

BACKGROUND OF THE INVENTION

The level of traffic that is routed over the public switched network is increasing at an appreciable rate, and is now straining the call processing and termination capacity of the various switches that form the network. Moreover, it is likely that the capacity of even the largest of such switches will be exhausted in the next decade due to the ever increasing levels of traffic. This problem could be addressed by building switches having a level of call processing and call termination capacity that is sufficiently large to deal with current as well as future levels of network traffic. However, the development and manufacture of such a large switch could be very expensive.

Alternatively, switches could be added to the network as needed to handle increasing levels of network traffic. However, since the switches forming a telecommunications network require a high degree of connectivity to minimize multihop routing and call processing as is shown in FIG. 1, then each switch that is thereafter added to the network to meet increasing traffic demands would have to be connected to many or all of the other switches in the network via respective trunks groups. For such full direct connectivity, the number of such trunk groups would equal the number of switches already in the network. Also, routing and translation tables at each of the existing network switches would need to be updated to account for the newly added switch. It may also be necessary to rehome a large number of toll connect trunks if the associated network happened to be a so-called interexchange carrier (IXC) network. It is thus apparent that adding switches to a network as they are needed would also prove out to be very expensive.

SUMMARY OF THE INVENTION

The problems associated with prior communication systems are dealt with by providing an architecture for a communication system which forms a plurality of communication switches into groups of communications switches as a way of increasing the call processing capacity of the resulting system, in accordance with the principles of the invention.

In one illustrative embodiment of the invention, a plurality of communication switches each associated with a respective connection control processor are formed into respective groups of communication switches. The communication switches forming a group of switches are fully interconnected to one another and each such switch is connected to at least one other group of telecommunication switches as a way of interconnecting the groups with one another. In this way a call received by the communication system is forwarded to a determined one of the switches in a selected one of the groups and the calling and signaling information associated with the call is supplied to the connection control processor associated with the determined one of the switches. The associated connection control processor then determines the way in which the call is to be forwarded to the called station via the determined switch.

These and other aspects of the invention will become apparent from the ensuing detailed description and accompanying drawings.

BRIEF DESCRIPTION OF THE DRAWING

In the drawing;

FIG. 3 is an illustrative example of a translation table that may be used to translate a telephone number into a switch cluster address;

FIG. 4 illustrates an alternative embodiment of a switch cluster of FIG. 1; and

DETAILED DESCRIPTION

An illustrative embodiment of the invention will be discussed in the context of a telecommunications system network operating as an Interexchange Carrier (IXC), which routes telephone calls, typically received from a Local Exchange Carrier (LEC), over long distances (thus, long distance calls) via conventional toll switches, e.g., the well-known 4ESS toll switch developed by Bell Laboratories and available from Lucent Technologies Inc. It should be understood, however, that such a discussion should not be taken as a limitation of the claimed invention, since those skilled in the relevant art and having knowledge of the following description will be able to devise many equivalent arrangements which embody the principles of the invention.

Figure 1:
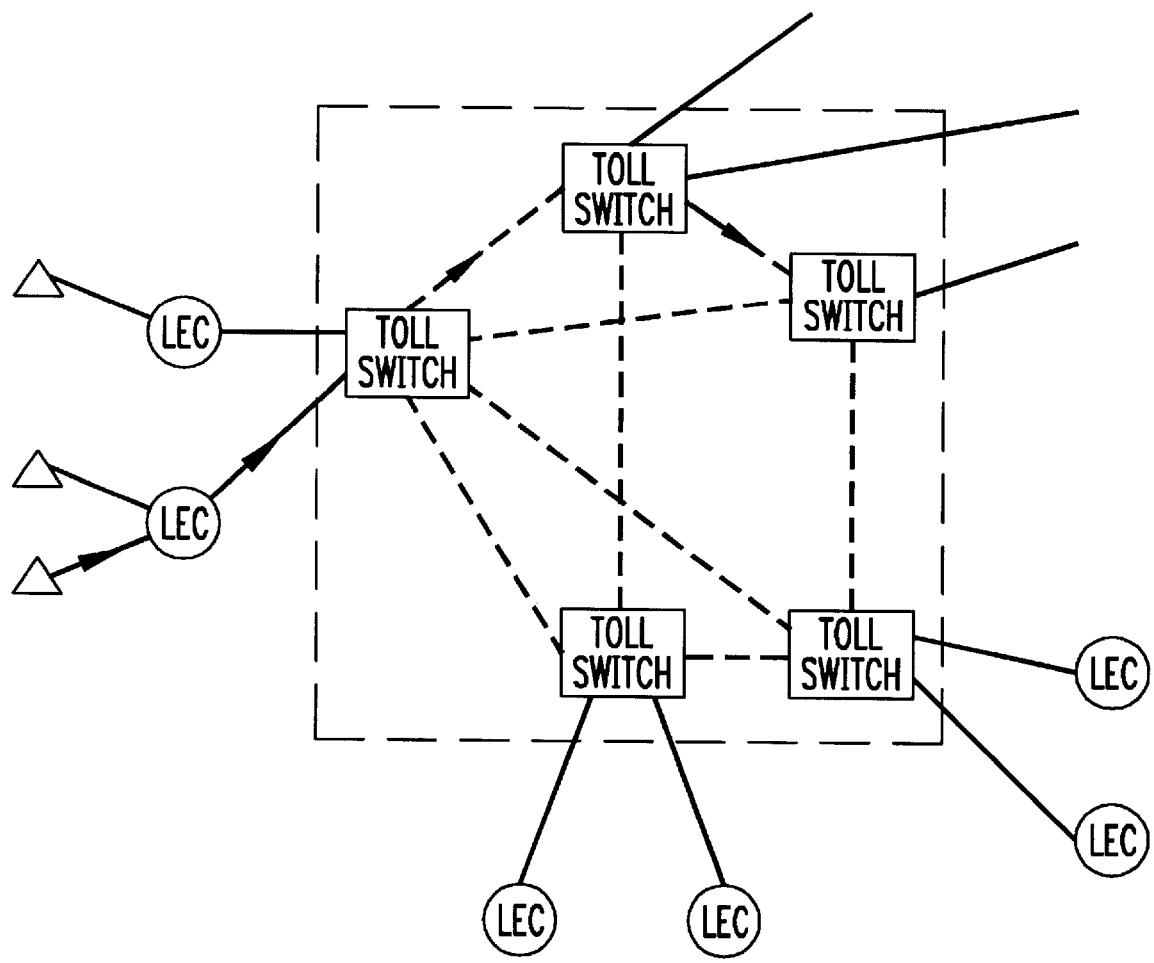
FIG. 1 illustrates the architecture of a prior art telecommunications system.
Figure 2:
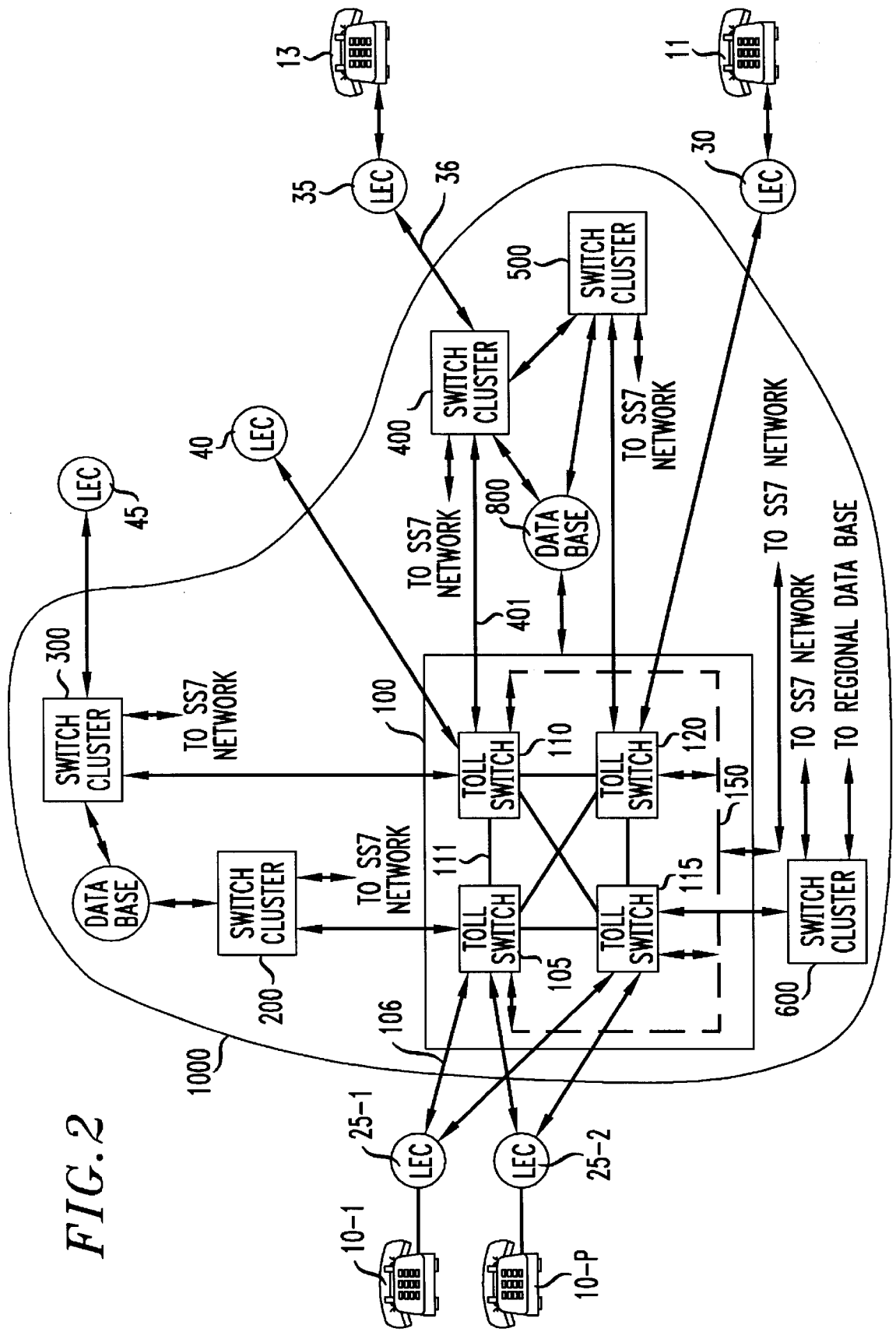
FIG. 2 illustrates a communications system arranged in accordance with the principles of the invention.

With the foregoing in mind, communications system 1000, FIG. 2, comprises a plurality of what we call switching centers (clusters), six of which are shown in FIG. 2, namely, switch clusters 100 through 600. Each switch cluster comprises a plurality of toll switches, where a toll switch may be, for example, the well known 4ESS toll switch available from Lucent Technologies Inc. In an illustrative embodiment of the invention, the switches forming a respective cluster are preferably co-located in the same building, and are fully interconnected to one another. The toll switches forming a cluster communicate with one another via, for example, a local data network 150 (shown as a dashed line in FIG. 2) for the purpose of forwarding call control to one another. For example, information associated with a call, e.g., called and calling telephone numbers, address of the trunk over which call is being forwarded and address of the destination switch cluster, is sent as an intra-cluster signaling message via data network 150 in the forwarding of a call from one switch in a cluster to another switch in the same cluster. The user information, e.g., voice samples, is routed over the trunk identified in the message once the call has been set up. The receiving switch thus correlates the information received via network 150 with the identified trunk to implement the connection.

Continuing, a switch cluster, in turn, is interconnected in accordance with an aspect of the invention with the other clusters of the network to eliminate the need to provide almost full connectivity of network switches, as was done priorly. (Note that we fully interconnect the switch clusters, but not the individual switches.) For the sake of brevity and clarity an example of such connectivity is illustrated with respect to cluster 100 only. We achieve full connectivity of clusters, in accord with an aspect of the invention, by interconnecting the clusters/buildings via trunk groups respectively associated with one or more switches forming the cluster. For example, switch cluster 200 connects to switch cluster 100 via toll switch 105; switch clusters 300 and 400 connect to cluster 100 via toll switch 110 and so on. The switch clusters communicate with one another via high-speed communication path, for example, a conventional SS7 network, to forward information relating to respective telephone calls that they may forward to one another as is done conventionally. Thus, at least one switch in a cluster (group) of switches has a direct trunk group to at least one switch in another cluster.

It is also seen from FIG. 2 that a Local Exchange Carrier (LEC) may be connected directly to a switch cluster, as is the case for LECs 25-1, 25-2, 30 and 40 connecting to switch cluster 100 or indirectly as is the case for LECs 35 and 45, which connect to switch cluster 100 via switch clusters 400 and 300, respectively. LECs, e.g., 25-1 and 25-2, may connect directly to two switches of the same cluster. (It is noted that in certain cases a LEC may connect to (home in on) at least two different switch clusters (not shown in the FIG.))

A telephone call is thus routed within the architecture of the communications system of FIG. 2 from one switch cluster (building) to a destination switch cluster (building) containing the switch fabric that extends the incoming call to the called telephone line. Such routing, therefore, contemplates a hierarchical addressing scheme that uses a unique code to identify a respective building/cluster, rather than a specific switch within the cluster. Within the cluster the address scheme is reduced to a code identifying the switch that may be used to forward/route the call to the called telephone line, in which the address scheme is further reduced within a switch to a code identifying the trunk which connects the switch directly/indirectly to the called telephone line.

When a call enters network 1000, the originating switch cluster that receives the call analyzes the called telephone to identify the destination switch cluster (i.e., the address of the destination cluster) for the call. The originating switch cluster (hereinafter also "OSC") then attempts to route the call to the destination switch cluster (hereinafter also "DSC") via a direct route (trunk). To do this, the OSC that received the call simply determines if it has an available direct trunk to the DSC. If so, then the OSC forwards the call to the DSC via the available trunk and forwards the associated call information thereto via an appropriate signaling path, e.g., the aforementioned the SS7 network. If a direct trunk is not available, then the OSC determines if a 2-link route to the DSC is available. In doing so, the OSC determines all of the available 2-link routes to the DSC and selects from the available 2-link routes the route containing the most lightly loaded communications paths or trunk groups, as is described in U. S. Pat. No. 5,101,451 issued Mar. 31, 1992 to G. R. Ash et al., which is hereby incorporated by reference, and routes the call via the link (path).

Assume at this point, that a user at station 13 places a long distance call to station 10-1. LEC 35, responsive thereto, collects the dialed called number, and forwards the call and dialed digits to the toll switch that is connected to path 36. The receiving toll switch that is within switch cluster 400, responds to receipt of the call and accompanying dialed number from LEC 35, by forming a message containing, inter alia, the called number and a translation request and sends the message to its associated regional data base 800. Data base 800, in turn, translates the called number into the address of the destination switch cluster (DSC) for the call. Data base 800 does this using a particular translation table. An Example of such a translation table is illustrated in FIG. 3. Briefly, a system administrator (not shown) stores in the memory of each of the regional data bases a copy of translation table 900 that is populated with 10 digit long distance telephone numbers (represented in FIG. 3 by letters, e.g., aaabbbcccc) and the addresses of the switch clusters (also represented in FIG. 3 by letters) which are the respective destination points (DSCs) for those numbers. The regional data base uses the received telephone number to index a location in table 900 and unloads the address stored at that location. The unloaded address is then returned to the originator of the request, which, in the present illustrative example, is switch cluster 400.

Upon receipt of the address of the destination switch cluster that serves the called telephone number, the receiving toll switch of cluster 400 (FIG. 2) uses that address to access a conventional translation table (not shown) that is stored locally to obtain the identity (address) of a trunk group that may be used to forward the call toward the DSC, in which the trunk group may be connected to another toll switch within the associated cluster rather than to the DSC. If the trunk group connects to another toll switch of the same cluster, then the latter translation table also provides the address of that toll switch. For that case, the receiving toll switch extends the call over an available trunk of the identified trunk group and supplies the call information and identity of the DSC to the toll switch identified by the latter translation, in which such information is supplied via an associated data network similar to network 150 in cluster 400. The latter toll switch then similarly determines the address of the an associated trunk group extending to the identified DSC and selects an available trunk from that group and routes the call to the DSC in a conventional manner. It also supplies the call information as a so-called Initial Address Message (IAM) addressed to the DSC via the SS7 network interconnecting the network switch clusters.

It is seen from the FIG. 2 that toll switch 110 interfaces switch cluster 100 with switch cluster 400. Accordingly, then, toll switch 110 receives the station 13 call via trunk group 401 and receives the associated call information (IAM message) via the SS7 network and local data network 150. Toll switch 110, in a similar manner, accesses its trunk table using the received DSC address to determine which of its trunk groups may be used to forward the received call toward its destination. In doing so, toll switch 110 determines via a local database (not shown) that the call may be routed via either toll switch 105 or 115, both of which connect to LEC 25-1 via respective trunk groups. Switch 110, therefore, selects the least loaded path, assumed to be via toll switch 105. Thus, for the present illustrative example, toll switch 110 selects an available trunk from trunk group 111 and forwards the call to toll switch 105 via the selected trunk. Toll switch 110 also supplies the associated call information to toll switch 105 via network 150. Upon receipt of the call, toll switch 105 determines in a conventional manner the local exchange carrier that is to receive the call, which in the present example would be LEC 25-1, and then forwards the call to LEC 25-1 in a conventional manner via path 106. LEC 25-1 then completes the connection to station 10-1 in a conventional manner and returns supervisory signals indicative of the progress of the call to toll switch 105. Toll switch 105, in turn, supplies the supervisory signals, e.g., answer supervision, to the OSC via SS7 network.

If switch cluster 400 finds that it does not have an available trunk to the DSC then, switch cluster 400 may forward the call using a scheme similar to the RTNR routing scheme disclosed in the aforementioned G. R. Ash patent In such a case, the call may be routed via, for example, switch cluster 500, which then forwards the call to cluster 100.

In an illustrative embodiment of the invention, a switch cluster may include a plurality of connection control processors (which may be, for example, a Pentium based computed supported by appropriate databases (not shown)) associated with respective ones of the toll switches forming the associated cluster as shown in FIG. 4. Specifically, each of the connection control (CC) processors 725-1 through 725-4 is arranged to implement the connection control functions previously performed by a toll switch as a further way of increasing the call processing capacity of a switch cluster. To that end, a CC processor, e.g., CC processor 725-1, on behalf of its associated toll switch, e.g., toll switch 705, receives and transmits call information via local high speed data network 750. Assume that a switch cluster (not shown) forwards a call to another switch cluster, e.g., cluster 700, via an intertoll trunk, e.g., trunk 706, and supplies the associated call information to the latter cluster via the SS7 network (in the form of a SS7 Initial Address Message (IAM) message). Such IAM information is first received by conventional SS7 interface module which monitors the SS7 network on behalf of its associated switch cluster. (The interface module may be, for example, a conventional signal processor.) If an SS7 message is addressed to that switch cluster, then interface 730 accepts the message. If the message is an IAM message, then Interface 730 processes the trunk group address contained in the message to determine which of the toll switches in the associated cluster is connected to toll trunk assigned to that address. When it makes that determination, then interface 730 appends the address of that toll switch to the IAM message and retransmits the message over high-speed data network 750.

Each of the CC processors 725-i monitor high speed data network 750 and accept messages addressed to its associated toll switch. Thus, for the present illustrative example, CC processor 725-1 accepts the message re-transmitted by interface 730. If the message is an IAM message, then CC processor 725-1 processes the contents of the message to determine the routing, i.e., the DSC (which could be a LEC) and which toll switch of the associated cluster is connected to the DSC. If CC processor 725-1 finds that the latter toll switch is toll switch 705, then CC processor 725-1 determines which trunk group associated with toll switch 705 is connected to the DSC and selects an available trunk from that trunk group (e.g., trunk group 707) to route the call received via trunk group 706 toward the DSC. CC processor 725-1 then determines the connection that needs to be establish through the toll switch 705 switch fabric (not shown) to the incoming call to the available trunk of trunk group 707. CC processor 725-1 then supplies the connection information and IAM message to the toll switch 705 switch controller (SC), which then establishes the identified connection over the associated toll switch 705 switching fabric. In addition, if CC processor 725-1 finds that the address of the DSC is assigned to another switch cluster in network 750, then CC processor 725-1 forms a new IAM message containing, inter alia, the call information and address of the trunk over which the call is being forwarded to the DSC and transmits the message over high speed data network 750. Interface 730 recognizing that the message is addressed to an external switch cluster, removes the message from network 750 and retransmits the message over the SS7 network.

CC processor 725-1 also performs the latter function if it finds that the DSC is a LEC that is connected to the SS7 network.

If the DSC is a LEC that is not connected to the SS7 network, then the toll switch 705 switch controller supplies the call information to the LEC via an alternative signaling arrangement, e.g., in-band signaling.

If CC processor 725-1 finds that the DSC is connected to another toll switch in cluster 700, then CC processor 725-1 identifies an available switch 705 trunk connected to that toll switch. Assuming that the latter toll switch is toll switch 715, then CC processor 725-1 determines the switch connection that needs to be established between incoming trunk 706 and the outgoing trunk, e.g., trunk 708 connected to switch 715. CC processor 725-1 then passes the connection information and received IAM to the toll switch 705 switch controller, which then establishes the identified connection over the switch 705 switching fabric. Similarly, CC processor 725-1 forms a new IAM message and sends the message to toll switch 715 via high speed data network 750. CC processor 725-3 accepts the message on behalf of toll switch 715 and then similarly processes the message in the manner described above for CC processor 725-1.

In an alternative embodiment of switch cluster 700, the first CC processor 725-i that receives the initial IAM message from another switch cluster, processes the call connection on behalf of the cluster, Specifically, for the above case, CC processor 725-1 determines the connection through the toll switch 705 switching fabric to trunk 708. It also determines a connection from the trunk 708 appearance at switch 715 and extending through the switch 715 switching fabric to an available output trunk to forward the call to the destination. CC processor 725-1 then sends the appropriate connection information to each toll switches 705 and 715 including the associated call information.

Figure 5:
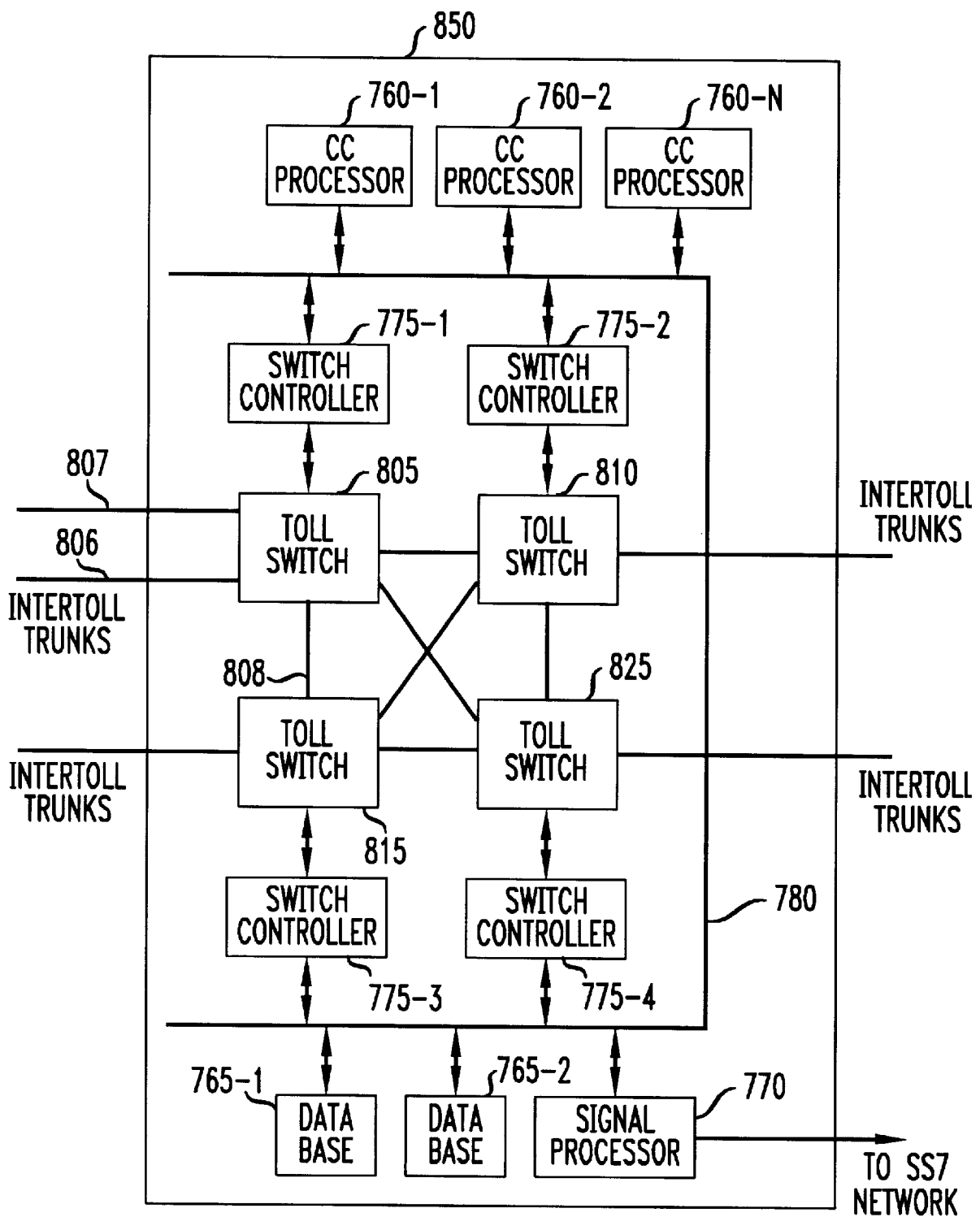
FIG. 5 illustrates another alternative embodiment of a switch cluster of FIG. 1.

In another illustrative embodiment of the invention, the switch controller function typically implemented in a toll switch is disposed external to the toll switch as is shown in FIG. 5, in which switch controllers 775-1 through 775-4 implement conventional call processing functions on behalf of the their respective toll switches 805, 810, 815 and 820. Each of the switch controllers 775-1 through 775-4 is connected to its respective toll switch for local switch control purposes and is also connected to high speed data network 780 for the purpose of the communicating with a Connection Control (CC) processors 760-1 through 760-N. CC processors 760-i (which also may be, for example, a Pentium based computed supported by appropriate databases (not shown)) are associated with cluster 850 rather than respective ones of the toll switches. Similarly, then, each of the connection control (CC) processors 760-1 through 760-N is arranged to implement the connection control functions previously performed by a toll switch connection controller and switch controller as a further way of increasing the call processing capacity of a switch cluster, in which the selection of CC processor to perform those functions on behalf of a toll switch is selected by processor 770.

Specifically, again assume that a switch cluster (not shown) forwards a call to another switch cluster, e.g., cluster 850, via an intertoll trunk, e.g., trunk 806, and supplies the associated call information to the latter cluster via the SS7 network IAM message. The IAM information is first received by SS7 signal processor 770 (which may be, for example, a conventional high-speed digital signal processing circuit). That is, processor 770 monitors the SS7 network on behalf of its associated switch cluster and accepts messages addressed to switch cluster 850. If the message is an IAM message, then signal processor 770 processes the incoming trunk group address contained in the message to determine which of the toll switches in the associated cluster is connected to the toll trunk assigned to that address. When it makes that determination, then processor 770 appends the address of that toll switch to the IAM message. Signal processor 770 then (a) selects, in accordance with a conventional load balancing scheme, e.g., a round-robin scheme, one of the CC processor 760-1 through 760-N to handle the incoming call, (b) prepends the address of that CC processor to the message and (c) transmits the resulting message over high-speed data network 780. Assuming that signal processor 770 selects CC processor 760-2 to handle the call, then the address of that processor is prepended to the transmitted message. Since CC processors 760-i monitor high-speed data network 780 for messages bearing their respective addresses, then processor 760-2 removes the transmitted message from network 780 and processes it. That is, If the message is an IAM message, then CC processor 760-2 processes the contents of the message to determine the routing to the DSC (which could be a LEG) and determine which toll switch of the associated cluster is connected to the DSC. CC processor 760-2 determines such routing by sending a request message to translate the called number into associated routing information to one of the data bases 765-i via data network 780. If the response from the accessed data base indicates that toll switch 805 is connected to the DSC, then CC processor 760-2 determines which trunk group associated with toll switch 805 is connected to the DSC and selects an available trunk from that trunk group (e.g., trunk group 807) to route the call received via one of the intertoll trunks 806 toward the DSC. CC processor 760-2 then determines the connection that needs to be establish through the toll switch 705 switch fabric (not shown) to connect the incoming call to an available outgoing trunk of trunk group 707. CC processor 760-2 then forms the connection information and IAM message into a message addressed to switch controller 775-1 associated with toll switch 805. Similarly, switch controller 775-1, responsive to receipt of the message, then directs the toll switch 805 switch fabric to establish the identified connection.

Similarly, if CC processor 760-2 finds that the address of the DSC is assigned to another switch cluster, then CC processor 760-2 forms a new IAM message containing, inter alia, the call information including and address of the trunk over which the call is being forwarded to the DSC and transmits the message over high speed data network 780. Signal processor 770 recognizing that the message is addressed to an external switch cluster, removes the message from network 790 and retransmits the message over the SS7 network. (Note that CC processor 760-2, as was discussed above in connection with FIG. 3, similarly performs the latter function if it finds that the DSC is a LEC that is connected to the SS7 network. Also, if the DSC is a LEC that is not connected to the SS7 network, then toll switch 805 supplies the call information to the LEC via an alternative signaling arrangement, e.g., in-band signaling, as is done conventionally. Also, when a LEC supplies call information to a toll switch via the alternative signaling arrangement, then that information is received by the toll switch and supplied to a CC processor via, for example, the associated switch controller or call processor. The CC processor then processes the information to determine the routing for the associated call, as discussed above.)

If CC processor 760-2 finds that the DSC is connected to another toll switch in cluster 850, then CC processor 760-2 identifies an available switch 805 trunk connected to that toll switch. Assuming that the latter toll switch is toll switch 815, then CC processor 760-2 determines the switch connection that needs to be established between incoming trunk 806 and the outgoing trunk, e.g., trunk 808, connected to switch 815. CC processor 760-2 passes the connection information and received IAM to the toll switch 805 switch controller, which then establishes the identified connection over the switch 805 switching fabric. Similarly, CC processor 760-2 (a) identifies an available switch 815 trunk that may be used to route the incoming call to the DSC, (b) forms a new IAM message identifying a connection between the available trunk and trunk 808, and (c) sends the message to toll switch controller 775-3 via high speed data network 780. Similarly, switch controller 775-3 accepts the message on behalf of toll switch 815 and then processes the message in the manner described above for switch controller 775-1.

The foregoing is merely illustrative of the principles of the invention. Those skilled in the art will be able to devise numerous arrangements, which, although not explicitly shown or described herein, nevertheless embody those principles that are within the spirit and scope of the invention. For example, a cluster or group of switches could include a Local Exchange Carrier (LEC) so that the cluster connects directly with subscriber. Moreover, the function implemented by a LEC could be implemented by a connection control processor or implemented by a toll switch. For the latter case, a toll switch would handle both local and long distance calls/traffic.

As another example, the type of switches used in one cluster could be different from the type switches used in another cluster. Moreover, the technology implementing one of cluster of switches could be different from the technology implementing another cluster of switches, e.g., Synchronous Transfer Mode (STM) as is implemented by the No. 4ESS toll switch and No. 5ESS switch, Asynchronous Transfer Mode, Frame relay, etc. This would allow transparent technology conversion at the trunk interface while call processing (signaling) conversions occurs in the connection controller. As another example, a switch cluster may contain a single switch. When another switch is added to that cluster, and thus to the associated network, there would be no need to interconnect the new switch with each of the other clusters in the network, since the cluster would have be already interconnected with the other clusters. All that needs to be done is to interconnect the new switch with the existing switch. As a further example, initially each cluster could have only a single switch and thereafter evolve into a network in which ones of the clusters may comprise different numbers of switches.

We claim:

1. A method of forming a plurality of communication switches into a communication network so that a call initiated by a calling station may be forwarded to a called station, said method comprising the steps of:

forming said plurality of communication switches into respective groups of communication switches;

associating the switches in a group with respective connection control processors, said connection control processors implemented externally from the switches in said group;

connecting each of the communications switches forming a respective one of said groups of communications switches to individual other ones of said groups of telecommunication switches as a way of interconnecting said groups of telecommunication switches with one another;

responsive to receipt of said call and accompanying calling information, determining as a function of the calling information which of said groups is a destination point in said communications network for said call; and forwarding said call, via said communication network, to a predetermined one of the switches in a particular one of said groups of said communication switches determined as said destination point and supplying calling and signaling information associated with said call to the connection control processor associated with the predetermined one of the switches so that the associated connection control processor may determine the way in which said call is to be forwarded to said called station via said particular one of said groups of said communication switches.

2. The method of claim 1 wherein said step of determining includes the step of:

associating each of said groups of communications switches with a unique identifier as a way of associating a telephone number identifying said called station with a particular one of said groups serving as a destination point in said communication network for calls placed to that telephone number; and determining said destination point by translating said called number into an identifier associated with said particular one of said groups.

3. The method of claim 1 further comprising the steps of:

receiving said call and at least a called number associated with said called station at another one of said groups of communication switches serving as an origination point within said communication network for said call;

translating said called number into an identifier associated with said particular one of said groups of said communications switches; and forwarding said call to said predetermined one of the switches via said communication network and supplying said calling and signaling information to the connection control processor associated with said predetermined one of the switches via a data network common to said communications network.

4. The method of claim 3 wherein said step of translating includes the step of sending at least said called telephone number in a message to a data base, said data base translating said called telephone number into the identifier associated with said particular one of said groups of said communication switches and then sending a return message containing at least the latter address to the originator of the message containing said called number.

5. The method of claim 3 further comprising the steps of:

receiving said call at said predetermined one of the switches forming said particular group of communication switches;

receiving said call and signaling information at the connection control processor associated with the predetermined one of the switches and determining which one of the switches forming said particular group of communication switches may be used to forward said call from said destination point to said called station; and forwarding said call to said called station via the determined one of the switches.

6. The method of claim 5 further comprising the step of:

responsive to said determined one of said switches being other than said predetermined one of the switches forming said particular group of communication switches, forwarding said received call from said predetermined one of the switches forming to said determined one of the switches so that said call may be forwarded to the called station.

7. The method of claim 5 further comprising the step of:

responsive to determining that said call may be forwarded to the called station via either said predetermined one of said switches or said determined one of said switches, selecting one of those switches as a function of a predetermined selection criterion and then forwarding said call to said called station via the selected switch.

8. A method of arranging a plurality of communication switches into a communication network so that a call initiated by a calling station may be forwarded to a called station via said communication network, said method comprising the steps of:

forming said plurality of communication switches into respective groups of communication switches such that the switches forming a respective group are interconnected to one another;

associating the switches in a group with respective connection control processors, said connection control processors implemented externally from the switches in said group, said connection control processors of an associated group being connected to one another for the purpose of exchanging call and routing information;

connecting each of the communications switches forming a respective one of said groups of communications switches to individual other ones of said groups of telecommunication switches as a way of interconnecting said groups of telecommunication switches with one another;

associating each of said groups of communications switches with a unique identifier as a way of associating a telephone number identifying said called station with a particular one of said groups serving as a destination point in said communications network for calls placed to that telephone number; and responsive to receiving said call at said communication network, forwarding said call via said communication network to a predetermined one of the switches in said particular one of said groups of said communication switches serving as the destination point for said call in said communication network and supplying calling and routing information associated with said call to the respective one of the connection control processors that is associated with the predetermined one of the switches so that the latter connection control processor may determine the way in which said call is to be forwarded to said called station via said particular one of said groups of said communication switches.

9. The method of claim 8 further comprising the steps of:

receiving said call and at least a called number associated with said called station at another one of said groups of communication switches serving as an origination point within said communication network for said call;

translating said called number into the identifier associated with said particular one of said groups of said communications switches; and forwarding said call to said predetermined one of the switches via said communication network and supplying said calling and routing information to said one of said connection control processors via a data network common to said communications network.

10. The method of claim 9 wherein said step of translating includes the step of sending at least said called telephone number in a message to a data base, said data base translating said called telephone number into the identifier associated with said particular one of said groups of said communication switches and then sending a return message containing at least the latter address to the originator of the message containing said called number.

11. The method of claim 8 further comprising the steps of:

receiving said call at said predetermined one of the switches forming said particular group of communication switches;

receiving said call and signaling information at said connection control processors and determining which one of the switches forming said particular group of communication switches may be used to forward said call from said destination point to said called station; and forwarding said call to said called station via the determined one of the switches.

12. The method of claim 11 further comprising the step of:

responsive to said determined one of said switches being other than said predetermined one of the switches forming said particular group of communication switches, forwarding said received call from said predetermined one of the switches forming to said determined one of the switches so that said call may be forwarded to the called station.

13. The method of claim 12 wherein the step of forwarding includes the steps of:

forwarding said received call over a connection interconnecting said predetermined one switch and said determined switch of the switches forming said particular group of communication switches; and supplying at least said calling information to the connection control processor associated with said determined one of said switches, in which said supplying is done via a data network interconnecting only the connection control processor associated with said particular group of communication switches.

14. A method comprising the steps of:

forming a plurality of communication switches into respective groups of communication switches, said groups of switches forming a communication network operative for forwarding a call initiated by a calling station to a called station;

connecting each of said groups of switches via respective signal processors to a data network common to said groups so that the groups of switches may exchange call and signaling information with each other;

connecting the switches forming a respective group of switches to respective switch controllers and interconnecting via a dedicated data network the switch controllers with a plurality of associated connection control processors, said connection control processors implemented externally from the switches in said group and connecting said dedicated network to said common network via a respective signal processor;

connecting each of the communication switches forming a respective one of said groups of communications switches to individual other ones of said groups of telecommunication switches as a way of interconnecting said groups of telecommunication switches with one another;

responsive to receipt of said call and accompanying calling information at said communication network, determining as a function of the calling information which of a said groups is a destination point for said call, and forwarding said call to one of the switches forming a particular group of communication switches identified as said destination point and forwarding calling and signaling information associated with said call to said particular group via said common data network;

receiving, via said common data network, said signaling information at the signal processor, said signal processor forwarding said calling and signaling information to a selected one of the plurality of associated connection control processors via the dedicated network; and at the selected one of the plurality of connection control processors (a) determining as a function of the received call and signaling information which the switches forming said particular group of communication switches may be used to forward said call to said called station, and (b) directing the switch controller associated with the determined switch to cause said one of the switches to forward said call to the determined one of the switches.

15. The method of claim 14 wherein each of the switches of a group have an associated switching fabric, and wherein said step of directing includes the step of determining the connection through the switching fabric associated with said one of the switches to route the call to the determined one of the switches and supplying the determined connection information to the respective one of the switch controllers, said respective one of the switch controllers then causing the switching fabric of said one of the switches to establish said connection.

16. The method of claim 14 wherein said step of directing further includes the step of determining the connection through the switching fabric associated with the determined one of the switches forward the call from the determined switch to the called station and supplying, via the associated dedicated data network, information defining that connection to that one of the switch controllers associated with the determined one of the switches, the latter switch controller then causing the switching fabric associated with the determined one of the switches to establish said connection.

17. A method of forming a plurality of communication switches into a communication network so that a call initiated by a calling station may be forwarded to a called station comprising the steps of:

forming said plurality of communication switches into respective groups of communication switches;

associating each of said groups of switches with a plurality of connection control processors each operative for routing a respective call through the associated group of switches, said connection control processors implemented externally from the switches in said group;

connecting each of the communications switches forming a respective one of said groups of communications switches to individual other ones of said groups of telecommunication switches as a way of interconnecting said groups of telecommunication switches with one another;

responsive to receipt of said call and accompanying calling information, determining as a function of the calling information which of said groups is a destination point in said communications network for said call; and forwarding said call, via said communication network, to a predetermined one of the switches in a particular one of said groups of said communication switches determined as said destination point and supplying calling and signaling information associated with said call to a selected one of the associated connection control processors so that the selected connection control processor may determine the way in which said call is to be forwarded to said called station via said particular one of said groups of said communication switches.

* * * * *